Feb. 14, 1967  H. J. BURTNETT  3,303,907
SAFETY BRAKE FOR VEHICLES
Filed March 19, 1965  3 Sheets-Sheet 2
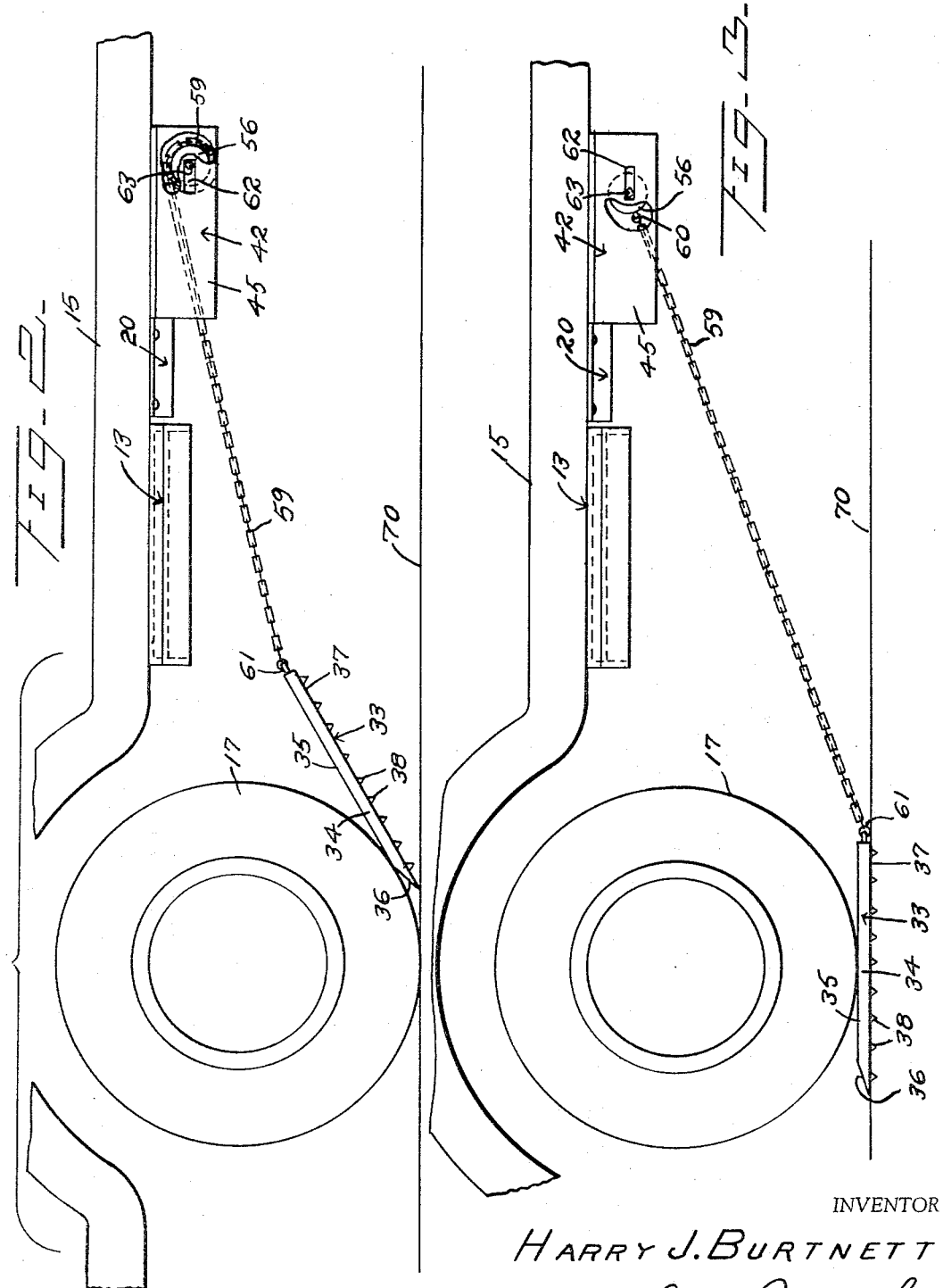
INVENTOR
HARRY J. BURTNETT
BY John N. Randolph
ATTORNEY

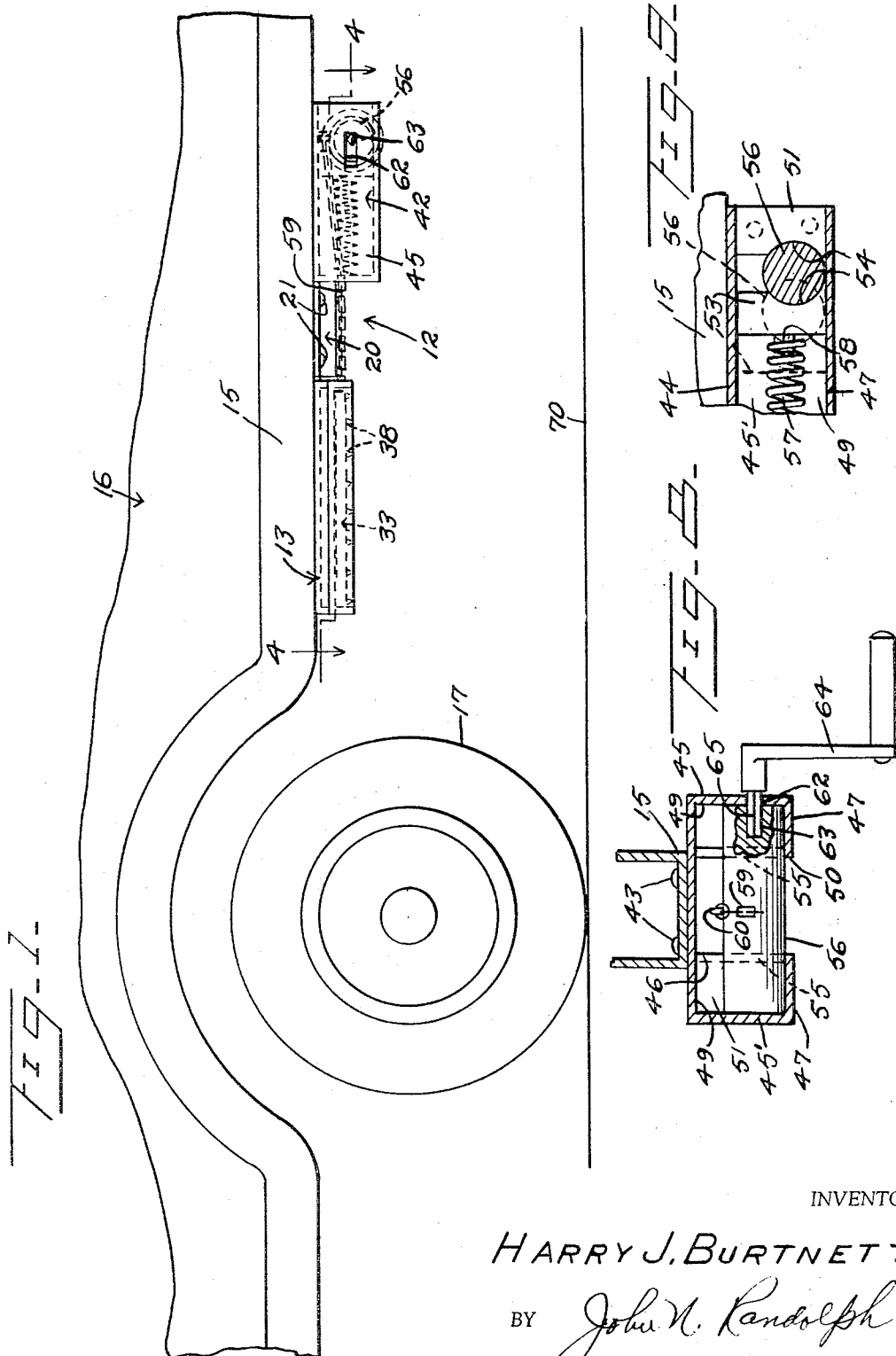

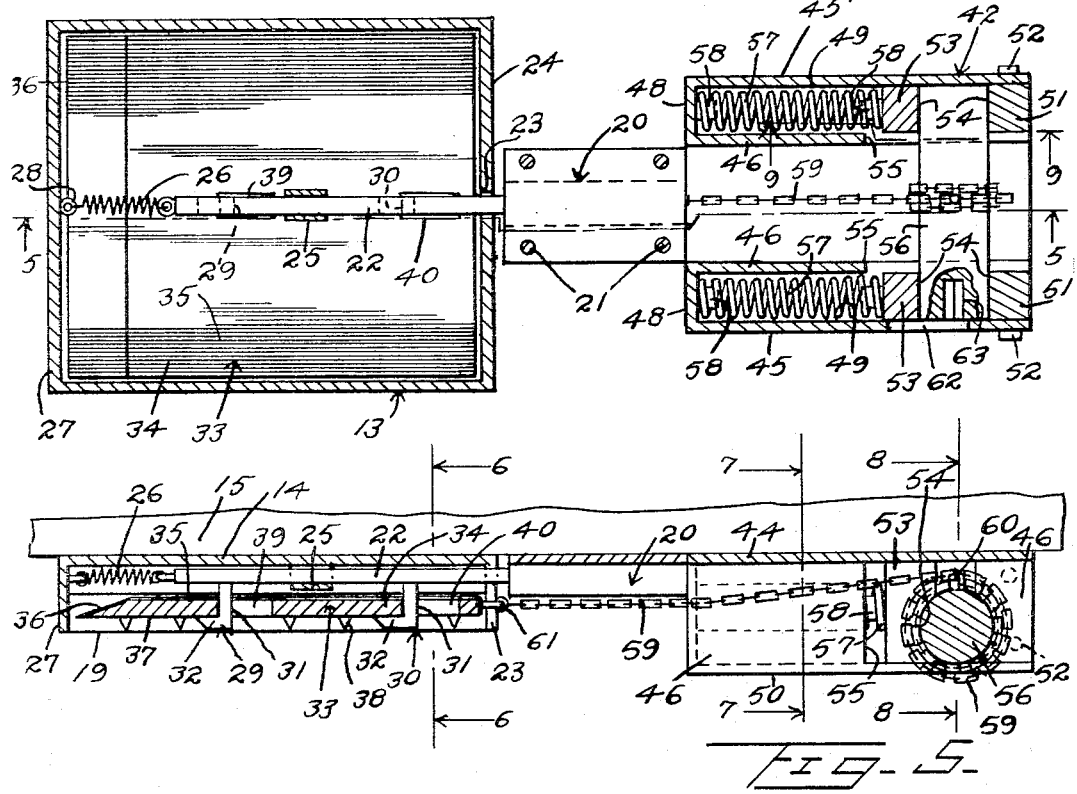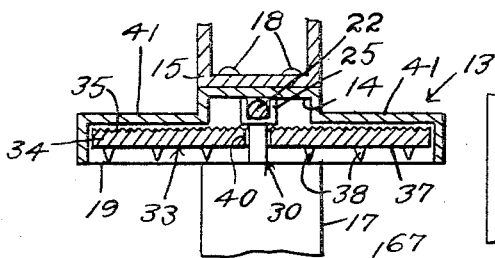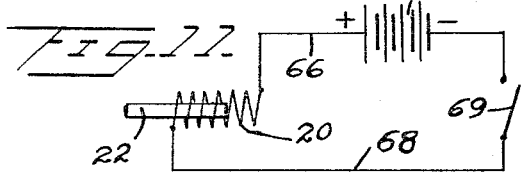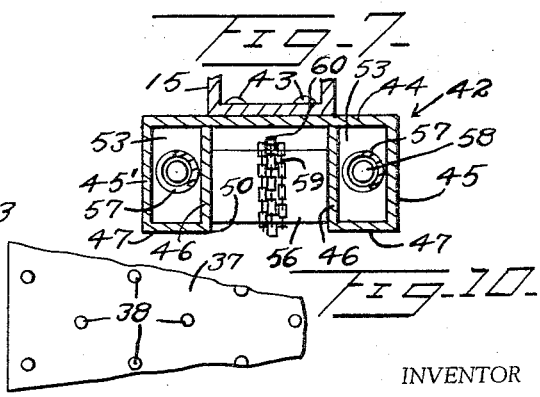

United States Patent Office 3,303,907
Patented Feb. 14, 1967

3,303,907
SAFETY BRAKE FOR VEHICLES
Harry J. Burnett, 2438 Kanawha Blvd. E.,
Charleston, W. Va. 25311
Filed Mar. 19, 1965, Ser. No. 441,187
5 Claims. (Cl. 188—4)

This invention relates to an auxiliary brake for motor vehicles which may be effectively utilized to quickly stop the forward movement of a vehicle which is skidding on ice, snow, or other slippery surface.

A primary object of the invention is to provide a brake capable of stopping a vehicle when the conventional vehicle brakes are ineffective, due to the vehicle tires being incapable of obtaining traction on a slippery surface.

Another object of the invention is to provide such an auxiliary brake having means whereby the brake can be rendered operative in a minimum amount of time and which can function even when the vehicle wheels are not turning.

Another object of the invention is to provide an auxiliary brake having novel means to effect release of a brake shoe so that the brake shoe will quickly assume a position beneath a wheel of the vehicle, for stopping the vehicle by contact with the surface on which the vehicle is travelling even though said surface is ice, snow or mud.

A further object of the invention is to provide a safety auxiliary brake having tethering means attached to the brake shoe for limiting the extent of movement of the brake shoe when released, to assure that the brake shoe will assume a position beneath a wheel of the vehicle, and for cushioning the final movement of the brake shoe relative to the vehicle.

Various other objects and advantages of the invention will hereinafter become more fully apparent from the following description of the drawings, illustrating a presently preferred embodiment thereof, and wherein:

FIGURE 1 is a side elevational view of the safety brake shown applied to a vehicle and in an inoperative position;

FIGURE 2 is a similar view, partly broken away, showing the brake released and approaching an operative position;

FIGURE 3 is a view similar to FIGURE 2, showing the safety brake in a fully operative position;

FIGURE 4 is an enlarged horizontal sectional view of the safety brake, taken substantially along the line 4—4 of FIGURE 1;

FIGURE 5 is a vertical sectional view thereof, taken substantially along the line 5—5 of FIGURE 4;

FIGURES 6, 7 and 8 are cross sectional views taken substantially along planes as indicated by the lines 6—6, 7—7, and 8—8, respectively, of FIGURE 5;

FIGURE 9 is a fragmentary sectional view taken substantially along the line 9—9 of FIGURE 4;

FIGURE 10 is a fragmentary bottom plan view of a part of the brake shoe, and

FIGURE 11 is a diagrammatic view illustrating the electric circuit of the safety brake.

Referring more specifically to the drawings, the safety brake in its entirety and comprising the invention is designated generally 12 and includes a housing or hood 13 having a longitudinally extending central top wall portion 14 which is adapted to be secured to the underside of a frame member 15 of a motor vehicle 16, in front of and adjacent to a rear wheel 17 of said vehicle. The portion 14 may be secured to the member 15 by suitable fastenings 18, as seen in FIGURE 6. The hood 13 is rectangular, as seen in FIGURE 4, and has an open bottom 19, as seen in FIGURES 5 and 6.

A conventional solenoid 20 is secured to the underside of the frame member 15 in front of the hood 13, by suitable fastenings 21. A rod 22 forms an extension of the armature of the solenoid 20 and extends rearwardly through a slot 23 in the front wall 24 of the hood 13, and longitudinally through a part of the hood 13, beneath a median portion of the top wall portion 14. Said rod or extension 22 extends slidably through a guide member 25 which is secured to and depends from the portion 14. As seen in FIGURE 4, one end of a pull spring 26 is connected to the rear end of the rod 22 and the other end of said pull spring is anchored in the rear wall 27 of the hood 13 by an eye connection 28.

As best seen in FIGURE 5, two hooks 29 and 30 are supported by and depend from the rod 22, behind and in front of the guide 25, respectively. Each hook has a straight depending shank 31 and a straight bill portion 32 which is disposed at a right angle to the shank 31. The bill portions 32 extend rearwardly from the lower ends of the shanks 31 and are disposed parallel to the rod 22. As seen in FIGURE 5, the bill 32 of the forward hook 30 is longer than the bill 32 of the rear hook 29, for a purpose which will hereinafter become apparent.

A brake shoe, designated generally 33, includes a thick rectangular metal plate 34 of a size to have a relatively close fitting engagement in the hood 13, as seen in FIGURES 5 and 6. The plate 34 has a longitudinally ribbed top surface 35 which is bevelled at the rear end of said plate, as seen at 36. The underside 37 of the plate 34 is substantially flat except for a plurality of depending cleats or spikes 38 which are staggeredly arranged, as seen in FIGURE 10. The plate 34 has two longitudinally spaced aligned openings 39 and 40 which are elongated lengthwise of said plate and disposed midway of its side edges.

The rod 22 may be retracted forwardly, from left to right of FIGURE 5, against the action of the spring 26, to permit the brake shoe 33 to be inserted into the hood 13 through the open bottom 19 thereof, and so that the hooks 29 and 30 will pass downwardly through the openings 39 and 40, respectively. The spring 26 is then permitted to displace the rod 22 rearwardly, from right to left of FIGURE 5, so that the bills 32 of the hooks will engage the underside 37 of the brake shoe, forwardly of the openings 39 and 40, as seen in FIGURE 5, for latching the brake shoe in its inoperative, stored position within the hood 13. When thus disposed, portions of the top surface 35 of the brake shoe will be disposed immediately beneath the top wall portions 41 of the hood, which straddle the portion 14, as seen in FIGURE 6, to prevent rocking movement of the brake shoe while stored in the hood.

An elongated housing 42 is secured to the underside of the frame member 15 by suitable fastenings 43, as seen in FIGURES 7 and 8. The housing 42 is disposed longitudinally of the frame member 15 and forwardly of the solenoid 20. The housing 42 includes a continuous top wall 44, side walls 45 and 45' which depend therefrom, and longitudinal interior walls 46 which are spaced from one another, as seen in FIGURE 7. The housing 42 has bottom walls 47 each of which extends between the side wall 45 or 45' and the adjacent longitudinal wall 46; and rear walls 48 which likewise extend between the adjacent walls 45 or 45' and 46, as seen in FIGURE 4. The walls 45, 45', 46, 47 and 48 combine with one another and with portions of the top wall 44 to form two transversely spaced longitudinally extending chambers 49. Between said chambers, the housing 42 has an open bottom 50, as seen in FIGURE 7.

Journal blocks 51, FIGURE 4, are secured in the forward ends of the chambers 49 by fastenings 52; and journal blocks 53 are slidably mounted in said chambers 49, rearwardly of and in alignment with the blocks 51. The aligned blocks 51 and 53 have opposed arcuately grooved faces 54, as seen in FIGURES 4 and 9. The interior walls 46 have openings 55 which extend from the fixed blocks 51 rearwardly to beyond the movable blocks 53, as seen in FIGURES 4 and 5.

A roller 56 extends through the openings 55 and has its ends disposed in the chambers 49, between the side walls 45 and 45', with said roller ends journaled in the block faces 54. A heavy coiled compression spring 57 is disposed in each chamber 49 between the rear wall 48 and the movable block 53 thereof, and with the ends of said springs bearing against said walls and blocks. Said walls and blocks have pins or projections 58 which extend into the spring ends for supporting the springs in said chambers and to prevent lateral movement of the blocks 53 relative to the chambers. Springs 57 yieldably urge the blocks 53 toward the blocks 51 so that the roller 56 is frictionally gripped between the journal blocks 51 and 53.

One end of a non-elastic flexible member 59, such as a chain, is anchored to an eye 60 which projects from an intermediate portion of the roller 56 (FIGURE 5), and the other end of said member 59 is anchored to an eye 61 which extends from the forward end of the plate 34 through the slot 23. The side wall 45, which faces outwardly of the side of the vehicle 16 on which the brake 12 is applied, has an opening 62 (FIGURES 1 and 4) which aligns with a socket 63 of noncircular cross section which opens outwardly at one end of the roller 56. A crank 64 (FIGURE 8) has a stem 65 which can pass through the opening 62 and engage non-rotatably in the socket 63, to enable the crank to be manually operated for rotating the roller 56 to wind the flexible member 59 thereon, for taking up slack therein. The frictional engagement of the bearing blocks 51 and 53 with the roller ends is sufficient to prevent the chain or flexible member 59 from becoming unwound from the roller while the brake shoe is supported in the hood 13.

As seen in FIGURE 11, a conductor wire 66 leads from the positive terminal of a storage battery 67 of the vehicle 16 to one terminal of the solenoid 20 and a conductor wire 68 leads from the negative terminal of the battery 67 to the other terminal of the solenoid 20. A normally open push button switch 69 is interposed in the conductor 68 and is located on the dashboard, not shown, of the vehicle 16, or elsewhere most convenient to the vehicle operator.

Only one safety brake 12 has been illustrated. However, it will be understood that a second safety brake 12 would be mounted on the other side frame member, not shown, of the vehicle 16 in front of the other rear wheel, not shown, of said vehicle. It will also be understood that the conductors 66 and 68 will be connected to the solenoids 20 of both brakes 12, so that the two brakes will function simultaneously, in the manner as hereinafter described in reference to the safety brake 12 which has been illustrated.

Assuming that the vehicle 16 is travelling on a slippery surface 70, such as an ice or snow covered surface, and that upon application of the conventional vehicle brakes, the vehicle wheels commence to skid and cease to rotate. When this occurs, the vehicle operator will manually close the switch 69 to energize the solenoid 20. This will cause the armature member 22 to be pulled forwardly, from left to right of FIGURE 5, against the action of the spring 26. When this occurs, the hook shanks 31 will move forwardly in the openings 39 and 40. The bill portion 32 of the rear hook 39 will initially disengage the underside 37 of the brake shoe 33 to release the rear portion of said shoe, after which the bill portion 32 of the forward hook 30 will release the forward portion of the shoe. Accordingly, the brake shoe 34 will drop from the hood 13 at an incline downwardly and rearwardly, as seen in FIGURE 2. The weight of the brake shoe 33 is sufficient so that the pull which it exerts on the flexible member 59 will overcome the frictional resistance of the bearing blocks 51 and 53 to cause the roller 56 to be revolved counterclockwise, as seen in FIGURES 5 and 9, for unwinding the chain 59 therefrom. Since the vehicle 16 is moving from left to right of FIGURES 1 to 3, as this occurs, the rear end of the brake shoe 33 will strike the surface 70, just in front of the wheel 17, before the chain 59 has been completely unwound from the roller 56. Even though the wheel 17 is sliding on the surface 70 and not revolving, it will ride up the rear ramp surface 36 of the brake shoe and on to the brake shoe, as a chain becomes completely unwound from the roller, as seen in FIGURE 3. To cushion the sudden jolt, which would otherwise occur, as the parts reach in their positions of FIGURE 3, the rear bearing blocks 53 yield rearwardly against the pressure of the springs 57, to allow the roller 56 to move rearwardly several inches, to the extent permitted by the wall openings 55 and by the springs 57 going solid, as illustrated in FIGURE 3 and in dotted lines in FIGURE 9. The weight of the wheel 17 and the portion of the vehicle supported thereby on the brake shoe 33, will cause its cleats 38 to embed themselves in the surface 70 to prevent the brake shoe from sliding on said surface and to effect almost immediate stoppage of forward movement of the vehicle.

Due to the width of the brake shoe 33 relative to the width of the wheel 17, as seen in FIGURE 6, and because of the roughened surface 35, the wheel 17 will be prevented from slipping laterally out of engagement with the brake shoe. It will also be understood that the brake shoe 33 may be made wider for accommodating it for use with a motor vehicle having dual rear wheels.

Due to the rapid action of the solenoid 20 when the switch 69 is closed, and the speed at which the brake shoe 33 will fall by gravity from the hood 13, it is possible for the brake shoe 33 to assume its position of FIGURE 3 under the wheel 17 in a fraction of a second after the switch is closed, irrespective of whether or not the wheel 17 is revolving. After stoppage of the vehicle has been effected, the vehicle wheel 17 can be backed off of the brake shoe 33 and the parts of the brake 12 can be returned to their inoperative positions of FIGURE 1, as heretofore described.

Various modifications and changes are contemplated and may be resorted to, without departing from the function or scope of the invention as hereinafter defined by the appended claims.

I claim as my invention:

1. A vehicle safety brake comprising a substantially flat rigid brake shoe, means supported by a motor vehicle frame part for supporting the brake shoe in an inoperative position in front of a wheel of the vehicle, means connected to said support means and operable to release the brake shoe from the support means to permit the brake shoe to drop by gravity to assume a position in front of said vehicle wheel, and tethering means connected to said brake shoe and anchored to the vehicle frame for limiting the extent of movement of the brake shoe toward said wheel whereby the vehicle wheel can assume a position on the brake shoe and is prevented from passing over the brake shoe, said support means comprising a slidably mounted rod and a pair of hooks depending from said rod, said brake shoe having openings through which said hooks extend, and said hooks having rearwardly projecting bill portions engaging the underside of the brake shoe when the rod is in a projected position for supporting the brake shoe.

2. A vehicle safety brake as in claim 1, said hooks being disposed one in front of the other, the rearwardly projecting bill portion of the forward hook being longer that the bill portion of the rear hook to effect release of a rear end of the brake shoe prior to release of the forward end thereof to cause the brake shoe to assume a position inclined downwardly and rearwardly while descending.

3. A vehicle safety brake as in claim 1, a hood supported by the vehicle frame for accommodating the brake shoe when supported by said support means and in which said support means is disposed, said hood having an open bottom through which the brake shoe is movable.

4. A vehicle safety brake as in claim 1, said release means comprising a solenoid, said rod forming a part of the solenoid armature and being adapted to be attracted forwardly when the solenoid is energized for disengaging the hooks from the brake shoe.

5. A vehicle safety brake as in claim 1, a roller to which one end of the tethering means is anchored, means secured to the vehicle frame and in which said roller is journaled, means for revolving the roller for winding the tethering means thereon, and means permitting a limited yielding movement of the roller toward said wheel after the tethering means is unwound from the roller by release of the brake shoe and when the brake shoe has assumed a position beneath the wheel.

References Cited by the Examiner

UNITED STATES PATENTS

| 653,817 | 7/1900 | Morgan | 188—4 |
| 1,621,431 | 3/1927 | Reber | 188—4 |
| 2,224,785 | 12/1940 | Greene | 188—4 |
| 2,746,570 | 5/1956 | Stahmer | 188—4 |

FOREIGN PATENTS 17,377  1906  Great Britain.

MILTON BUCHLER, *Primary Examiner.*

B. S. MOWRY, *Assistant Examiner.*